United States Patent [19]

Cardwell et al.

[11] 4,052,054
[45] Oct. 4, 1977

[54] SEQUENTIAL LOAD DUAL DOCUMENT FEED

[75] Inventors: William Richard Cardwell; Carl Alan Queener, both of Boulder, Colo.

[73] Assignee: International Business Machines Corporation, Armonk, N.Y.

[21] Appl. No.: 669,546

[22] Filed: Mar. 23, 1976

[51] Int. Cl.² .............................................. B65H 7/02
[52] U.S. Cl. .................................. 271/227; 271/238; 271/245; 271/251
[58] Field of Search ............... 271/226, 227, 228, 236, 271/238, 240, 245, 248, 250, 251

[56] References Cited

U.S. PATENT DOCUMENTS

| | | | |
|---|---|---|---|
| 1,831,245 | 11/1931 | Hitchcock | 271/225 UX |
| 2,638,343 | 5/1953 | Luehrs | 271/236 |
| 3,866,906 | 2/1975 | Berry | 271/250 X |
| 3,877,804 | 4/1975 | Hoppner | 271/236 X |
| 3,908,986 | 9/1975 | Bleau | 271/236 X |
| 3,934,868 | 1/1976 | Selak | 271/238 X |

*Primary Examiner*—Richard A. Schacher
*Attorney, Agent, or Firm*—John H. Holcombe; Homer H. Knearl

[57] ABSTRACT

In a copier, an original document feed moves two originals to be copied simultaneously onto a document glass. The document glass is 11 inches by 17 inches and accommodates two 8½ by 11 inch documents side-by-side. The dual document feed is loaded sequentially with two originals and registers the two originals side-by-side to right and left corner references at an entry station. The entry station includes aligning rollers whereby the operator need only position the originals close to the correct position. The aligning rollers then corner-register the documents side-by-side. After the originals have been registered side-by-side in the entry station, they are automatically fed forward substantially simultaneously to be registered side-by-side on the document glass. Electronic control circuits are shown whereby the dual document feed apparatus may be controlled to feed either single or dual original documents.

17 Claims, 6 Drawing Figures

SEQUENTIAL LOAD DUAL DOCUMENT FEED

BACKGROUND OF THE INVENTION

1. Field of the Invention

This invention relates to feeding original documents to the scanning station in a copying machine. More particularly, this invention relates to automatically feeding two originals in side-by-side registration to the scanning station while permitting the documents to be loaded into the document feeding apparatus sequentially.

2. Description of the Prior Art

Duel document copying is usually done on a copying machine capable of reducing dual documents to smaller copy. Typically two 8½ × 11 inches original documents would be reduced to fit on a single 8½ × 11 inches copy sheet. The feeding of dual documents to the scanning station of a copying machine is shown in U.S. Pat. No. 3,288,459. However, the operation as described in this patent requires a great deal of operator interaction. The operator is essentially the registering device for side-by-side registration. Further, after the operator has registered the documents side-by-side, he moves the documents simultaneously forward himself until the scanning station apparatus seizes the documents to begin scanning the documents. The prior art double document scanning station apparatus requires time consuming, precise operations by the operator. Accordingly, the time to load documents into the copying machine for dual document copying is relatively slow and the throughput for the copying job is therefore slow.

Semi-automatic feeding for single documents is shown in U.S. Pat. No. 3,908,986. Semi-automatic document feeding means an operator supplies documents to the entry station rather than mechanical apparatus. (Totally automatic document feeding usually refers to the operator stacking all the originals in a hopper and having the machine feed all the documents from the hopper to an entry station.) This patent shows apparatus for aligning single documents to a corner reference at an entry station. From the entry station the single document may be released to be fed forward onto a document glass or scanning station in a copier. Semi-automatic feeding works well in simplifying the operator interface for feeding single documents into a copying machine. U.S. Pat. No. 3,908,986 does not discuss problems associated with side-by-side registration and feeding of dual documents into a scanning station.

The problem is how to simplify the simultaneous feeding of two originals that are being supplied by hand to the document feeding apparatus by the operator. Side-by-side registration of the original documents by the operator is not desirable because of the precise and time consuming nature of the task. Restated, the problem is how to permit the operator to place the two originals at the input or entry station for the copier within a prescribed position having a wide tolerance and thereafter operating the machine so that the machine may register the documents side-by-side for scanning.

SUMMARY OF THE INVENTION

In accordance with this invention the problem has been solved by dual alignment apparatus to obtain side-by-side registration at an entry station. The side-by-side registration in the entry station is corner-referenced to two outside corners positioned so that the documents lay side-by-side when both are registered. Thereafter the machine automatically feeds the side-by-side documents from an entry station to a scanning station. The aligning mechanism cooperates with the forward feeding apparatus to move the documents substantially simultaneously side-by-side forward to the scanning station. At the scanning station the documents are again corner-registered to outside corners positioned such that the documents lie side-by-side on the scanning station or document glass.

As a further feature of the invention, the dual alignment apparatus is controlled in a manner such that the apparatus may handle semi-automatic document feeding of a single document or semi-automatic feeding of dual documents sequentially supplied to the apparatus.

The great advantage of our invention is that throughput for dual document copying jobs is increased by simplifying the task of the operator in loading two originals into the copier. The invention permits the operator to place the two originals sequentially within a relatively wide target area. Thereafter, the dual document feeding apparatus registers the documents side-by-side for copying. The operator is not required to precisely position either of the two original documents. Thus, the loading speed of originals into the copier is much faster than prior dual document copying machines.

DETAILED DESCRIPTION OF THE PREFERRED EMBODIMENT

Figure 1:
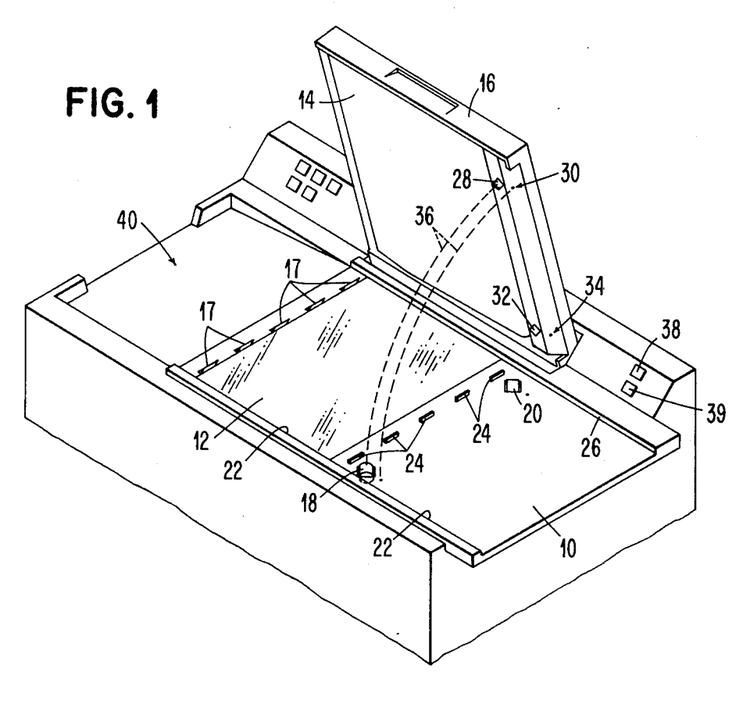
FIG. 1 is a perspective view showing elements of a preferred embodiment of the dual document feed and their position relative to the document glass.

A perspective view of the preferred embodiment of the invention is shown in FIG. 1. Single or dual documents are loaded on the entry plate or entry station 10 by an operator. The document feed apparatus of the invention will position a single document or dual documents on the document glass 12. The belt 14 for driving the documents from the entry station 10 to a scanning station or document glass 12 is in the document glass cover 16. The document glass cover is hinged so that it may be rotated up when the operator wishes to copy books or large documents and is not using the document feed belt 14. FIG. 1 shows cover 16 swung up from the document glass so as to better illustrate the elements of the invention.

To register dual documents at the entry station 10, the operator places one document to the left or at the front of the entry station and one document to the right or at the rear of the entry station. The operator need only place the document in contact with the front aligner wheel 18 or the rear aligner wheel 20. Once the document is engaged by the aligner wheels the document is driven to corner registration defined by the front edge guide 22 in combination with entry gate 24 or the rear edge guide 26 in combination with the entry gate 24.

The cover 16 in addition to containing the document feed belt 14 also carries front pinch roll 28 with front sensor 30 and rear pinch roll 32 with rear sensor 34. Dashed lines 36 show the position of the pinch rolls and sensors immediately above the entry plate 10 when the cover 16 is lowered down in an operative document feed position. Front pinch roll 28 cooperates with front aligner wheel 18 to corner register front documents on the entry plate 10. Similarly rear pinch roller 32 cooperates with rear aligner wheel 20 to corner register rear documents on the entry plate 10. When front and rear document are corner registered they are in side-by-side registration on entry plate 10. This assumes that the documents are 8½ by 11 inch documents and the entry plate is 17 inches wide.

In operation, for a single document, semi-automatic document feed, the operator checks the control panel to see that a control button 38 for "single document" is on. With cover 16 down the operator slides the single document on the entry plate 10 towards aligner wheel 18. When light sensor 30 detects the presence of the document the aligner wheel 18 is driven and moves the single document into corner registration at the front corner of entry plate 10. After the single document has been corner registered the front aligner wheel is no longer driven.

With a single document registered in the front corner a copier cycle control generates a feed document signal. The feed document signal activates belt 14, drops entry gate 24 out of the path of the document and reactivates aligner wheel 18. Aligner wheel 18 moves the document past the entry gate 24, and the document engages belt 14. Belt 14 then carries the document across the document glass to abut against exit gate 17. Driving aligner wheel 18 while the document is moving across the document glass serves two functions. It helps move the document across the document glass and keeps the document registered against the edge guide 22. Thus, when the document strikes the exit gate 17 it will be corner registered to the front corner of the document glass 12. After the document is corner registered on the document glass 12, the document-feed belt 16 stops.

With the document on the document glass, the copying machine proceeds to scan the document. After the image portion of the copying cycle is completed, the copier cycle control generates a signal to drop the exit gate 17 and reactivate the belt 16. The document is then driven by belt 16 into the exit tray 40. At the same time that the document is exiting from the document glass 12 a new document will be fed onto the document glass 12 if the new document is present on the entry plate 10. This completes a single document semi-automatic document feed operation.

To perform a semi-automatic dual-document feed, the operator pushes button 39. Button 39 might be marked "dual" or "reduction." When in a reduction mode as signaled by button 39 being on, the copier scanning optics are activated to reduce the larger scanning image of dual documents down to a smaller copy size. Also in "dual" or "reduction" mode as signaled by button 39, both the front and rear sensors and the front and rear aligner wheels become active.

With cover 16 closed the operator places one original on the entry plate 10 and slides it toward rear aligner wheel 20. As soon as the rear sensor 34 detects the presence of the document, rear aligner wheel 20 is active to corner register the document in the rear corner of the entry plate 10. This occurs so rapidly that by the time the operator is placing the second document on the entry plate 10, the first document has been corner registered. The operator then places the second document on the entry plate and positions it towards the front aligner wheel 18. As soon as the front sensor 30 senses the presence of the document, front aligner wheel 18 is driven to corner register the document to the front corner of entry plate 10.

After both documents have been corner registered and thus are registered side-by-side, the copier cycle control drops the entry gate 24, reactivates the front aligner 18, rear aligner wheel 20, and turns on document feed belt 16. The two documents are then fed side-by-side onto the document glass until they abut against exit gate 17. The front and rear aligner wheels serve to move the document forward past the entry gate until the documents are engaged by the document feed belt. At the same time, the front and rear aligner wheels keep the documents registered against the front edge guide 22 and the rear edge guide 26 respectively. Thus, the documents are carried onto the document glass 12 side-by-side and corner registered at the exit gate. With side-by-side registration accomplished on the document glass 12, the aligner wheels 18 and 20 and the feed belt 16 are turned off.

After the imaging portion of the copying cycle is complete, the copier cycle control drops the exit gate 17 and reactivates the feed belt 16. The two documents are then fed side-by-side off the document glass into the exit tray 40.

DUAL DOCUMENT FEED MECHANICAL ELEMENTS

Figure 2:
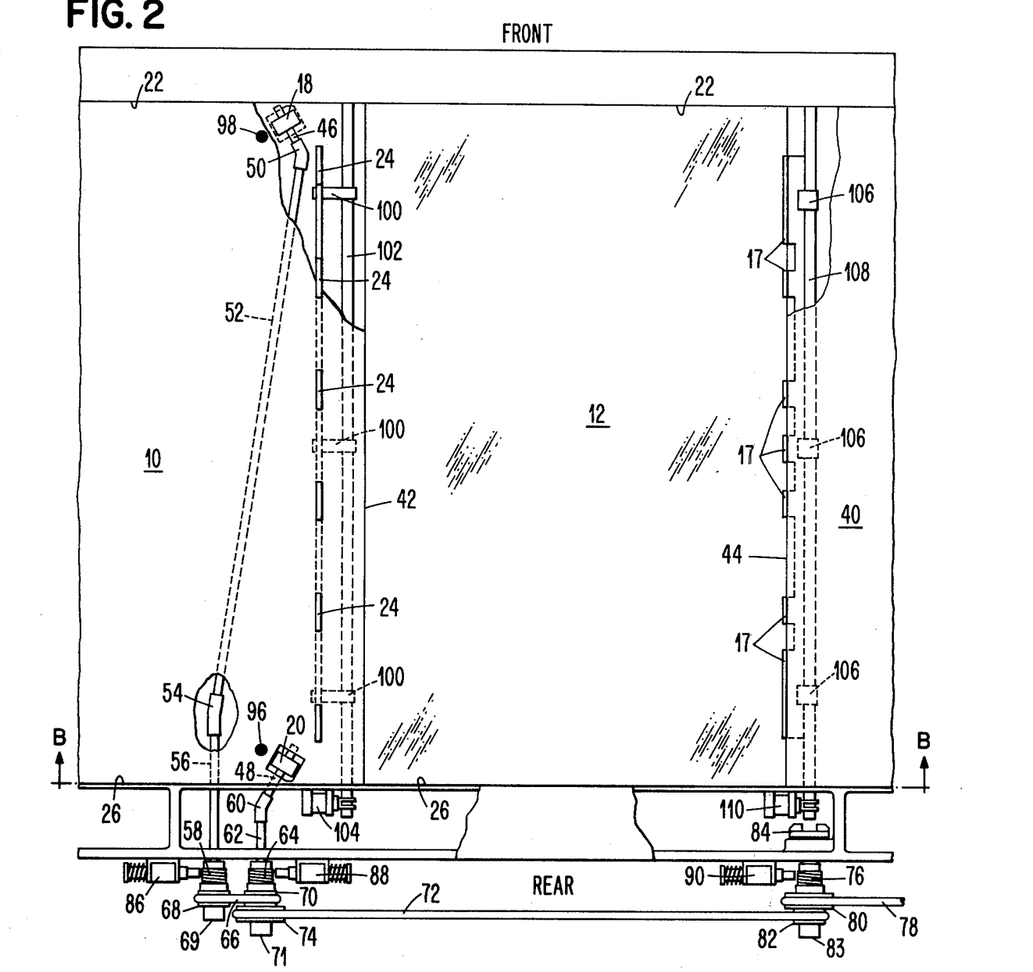
FIG. 2 is a top-view of the preferred embodiment of the dual document feed with the top cover removed showing the entry gate, exit gate, aligner wheels, and selectively operated drive train for each of these elements.
Figure 3:
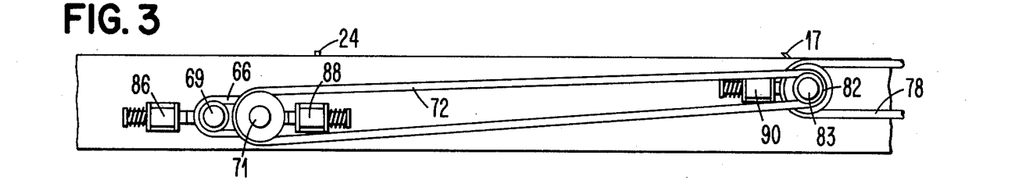
FIG. 3 is a side view of FIG. 2 showing the drive train for the document feed belt and the aligner wheels.
Figure 4:
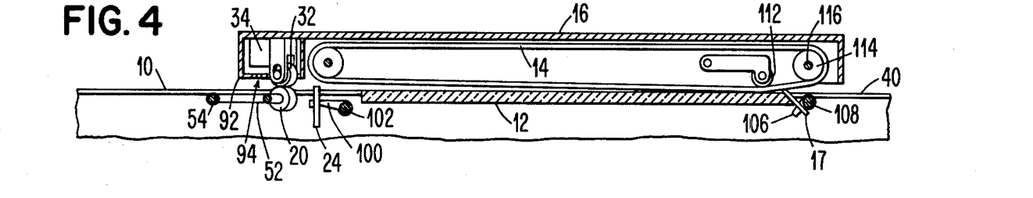
FIG. 4 is a cross-sectional view along section line BB of FIG. 2 but with the top cover in place, showing the entry and exit gates, the document-feed belt, one aligner wheel and one document sensor positioned adjacent the aligner wheel.

Referring now to FIGS. 2, 3 and 4 the mechanical elements of the preferred embodiment will be described. The view in FIG. 2 is a top-view with the cover 16 (FIG. 1) removed. Further the view is oriented so that the front of the machine is at the top of FIG. 2 and the rear of the machine is at the bottom of FIG. 2. Thus, documents enter the entry plate 10 from the left side of FIG. 2.

The entry plate 10 extends to boundary line 42 where it abuts against the document glass 12. Entry gate 24 extends through slots in the entry plate 10. The slots in the entry plate 10 are substantially the same size as the entry gate fingers. Of course, enough clearance must be allowed for the fingers to move easily through the slots as the entry gate is raised or dropped. The front corner of the entry plate 10 is cut away so as to reveal a portion of the entry gate drive apparatus and the drive apparatus for the front aligner wheel 18.

Similarly, exit plate 40 abuts the document glass 12 at boundary line 44 and has a portion cut away in its front corner to show a portion of the drive apparatus for the exit gate 17. Exit gate 17 extends through slots cut in the boundary 44 of the document glass 12. The slots are substantially the same size as the fingers of the exit gate 17. Sufficient space is allowed between the slots and the fingers of the exit gate 17 to allow the gate to move up and protrude above the document glass 12 or to be dropped below the surface of the document glass 12 as selected. The operation of the entry gate 24 and the exit gate 17 will be described in more detail hereinafter with reference to FIG. 4.

As shown in FIG. 2 the aligner wheels 18 and 20 are mounted on shafts 46 and 48, respectively. Journals for the shafts are not shown in FIGS. 2, 3 or 4 as they would only serve to confuse the illustration. For aligner wheel 18 shaft 46 is driven via coupling 50, shaft 52, coupling 54, shaft 56 and shoe actuated spring clutch 58. Similarly, rear aligner wheel 20 is driven through shaft 48, coupling 60, shaft 62 and shoe actuated spring clutch 64.

The driving sides of spring clutches 58 and 64 are coupled together by belt 66 riding on pulleys 68 and 70. The rotational drive comes to clutch 64 by belt 72 on pulley 74. Belt 72 couples to the driving side of shoe actuated spring clutch 76. The driving side of clutch 76 is powered by belt 78 on pulley 80. Pulley 82 rotates with pulley 80 to drive belt 72. Driving power comes from a main drive motor 126 (FIG. 5) which drives belt 78. Thus, the main driving motor powers the driving side of all three shoe actuated spring clutches 58, 64 and 76.

The driven side of clutch 76 connects to a crown gear 84. Crown gear 84 provides drive to the feed belt 14 (FIG. 1) in the cover 16 (FIG. 1) when the cover is closed over the document glass. The cover contains a shaft and crown gear arrangement (not shown) to drive the document feed belt. The crown gear in the cover engages crown gear 84 in FIG. 2 when the cover is closed over the document glass 12.

To activate the front aligner wheel 18 front aligner solenoid 86 is energized. When solenoid 86 is energized it extends forward to push a shoe against spring clutch 58. As the shoe pushes the spring of clutch 58 against shaft 56 to be driven the spring grips the shaft and power is transmitted through the clutch to rotate the front aligner wheel 18. Similarly, rear aligner solenoid 88 and feed belt solenoid 90 may be energized to push against spring clutches 64 and 76 respectively. With spring clutches 64 and 76 engaged, power is coupled to rear aligner wheel 20 and the feed belt crown gear 84, respectively.

FIG. 3, which is a side view of FIG. 2, shows the vertical displacement of the various shafts to drive the document feed belt and front and rear aligner wheels. Power comes in over belt 78 to rotate shaft 83 carrying pulley 82. Pulley 82 passes the power to belt 72 which drives shaft 71. Shaft 71 in turn drives belt 66 which drives shaft 69. Shafts 69 and 71 are below the level of the document glass while shaft 83 is above the level of the document glass and hence the vertical displacement between the shafts in FIG. 3.

Shaft 83 aligns with the axis of the crown gear 84 in FIG. 2 to engage the cover crown gear (not shown) when the cover is closed. Shafts 71 and 69 align with the drive shafts 56 and 62 in FIG. 2 which provide power to the front aligner 18 and rear aligner 20 in FIG. 2. FIG. 3 also shows the vertical placement of front aligner solenoid 86, rear aligner solenoid 88 and belt control solenoid 90.

FIG. 4 is a view along sectional lines BB in FIG. 2 and in addition includes document cover apparatus not shown in FIG. 2. Document cover 16 as previously stated for FIG. 1 carries the document feed belt 14, pinch rollers 28 and 32 and sensors 30 and 34. The view in FIG. 4 shows only the rear pinch roller 32 and the rear sensor 34. Immediately below the belt 14 in FIG. 4 is the document glass 12. The exit plate 40 abuts the document glass on the right and entry plate 10 abuts the document glass on the left. Entry gate 24 extends through the entry plate 10 and exit gate 17 extends through the document glass 12. The rear aligner wheel 20 extends through the entry plate 10 to pinch original documents between itself and the pinch roller 32. Pinch roller 32 extends through wall 92 which is a part of the cover 16. Wall 92 also has a hole 94 through which light from sensor 34 may sense the presence of a document immediately adjacent the rear aligner wheel 20. Shaft 52 and coupling 54 shown in FIG. 4 are part of the drive for front aligner wheel 18 which cannot be seen in FIG. 4 because it is behind aligner wheel 20.

The aligner wheels 18 and 20 may be made of soft rubber and the pinch rollers 28 and 32 of a harder plastic material. Typically the pinch rollers 28 and 32 would be spring biased against the aligner wheels 18 and 20. An alternate configuration for the aligner wheels is shown in U.S. Pat. No. 3,908,986, previously discussed under "Background of the Invention."

The front sensor 30 and the rear sensor 34 are preferably a modular structure containing a light emitting diode and a photocell. Light from the light emitting diode passes down through a hole 94 in FIG. 4 and is reflected back from either the entry plate 10 or a document resting on the entry plate. Entry plate 10, as shown in FIG. 2 contains two blackened dots 96 and 98. When there is no document present light from a light emitting diode in the front or rear sensor strikes these black dots and little light is reflected back to the sensor. When a document is present on the entry plate more light will be reflected back to the front and rear sensors. The sensors will then indicate the presence of a document adjacent the aligner wheels. Alternatively, microswitches might be used with protruding fingers to sense the presence of the document adjacent the aligner wheels.

The operation of the entry gate 24 is most easily understood by viewing both FIGS. 2 and 4. The entry gate consists of fingers of a plastic plate that protrude through the entry plate to block passage of the document onto the document glass. The plastic plate contains holes through which pawls 100 protrude. Pawls 100 are mounted on shaft 102 which is rotated by solenoid 104. Solenoid 104 is spring loaded such that when it is inactive shaft 102 rotates to lift pawl 100 and the fingers of entry gate 24 above the surface of the entry plate 10. When the entry gate solenoid 104 is activated, shaft 102 rotates pawls 100 down. Pawls 100 pull the entry gate 24 down. With entry gate 24 pulled down by entry gate solenoid 104, aligner wheels 18 and 20 in combination with the belt 14 will drive documents onto the document glass 12. As stated previously, the aligner wheels serve to push the documents against the edge guides 22 and 26 as the documents feed forward onto document glass 12.

Exit gate 17 is also a plastic plate as was entry gate 24. The fingers of the plate extend above the surface of the document glass 12 to form the exit gate. The lower portion of the sheet stock contains slots through which pawls 106 extend and engage the plate. Pawls 106 are attached to shaft 108. Shaft 108 is rotated by exit gate solenoid 110.

When the exit gate solenoid 110 is inactive it is spring biased to rotate shaft 108 to lift the exit gate fingers 17 above the surface of the document glass 12. Energization of solenoid 110 rotates shaft 108 to pull pawls 106 down. Pawls 106 then pull the plate making up the exit gate 17 down and the exit gate goes below the surface of the document glass 12. With the exit gate down, feed belt 14 may be energized to move documents from the document glass to the exit plate 40.

As shown in FIG. 4 the document feed belt 14 is positioned closer to the doocument glass 12 at the exit gate than it is at the entry gate. This assists the aligning rollers 18 and 20 in holding the edge of the document against the edge guide 22 and 26 in FIG. 2 as the document is moved across the document glass 12. Pressure roller 112 is used to hold the document feed belt 14 closer to the glass 12 at the exit gate 17. Document feed belt 14 is driven by roller 114 attached to shaft 116. Shaft 116 has mounted at its ends a crown gear (not shown) that engages crown gear 84 (FIG. 2) when the cover 16 is closed over the document glass 12.

ELECTRONIC CONTROL

Figure 5:
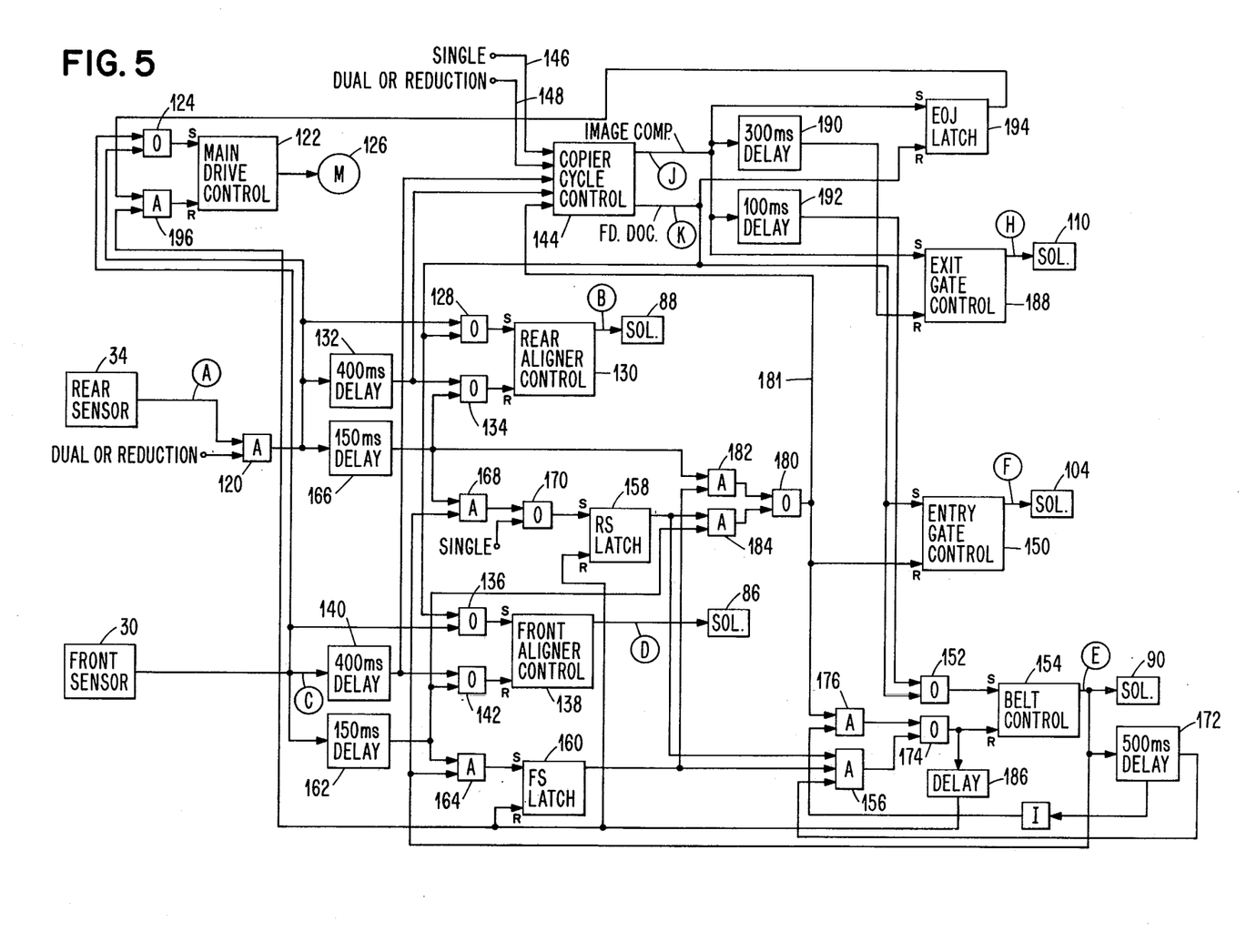
FIG. 5 shows the logic for controlling the elements of the preferred embodiment of the invention in FIG. 2.
Figure 6:
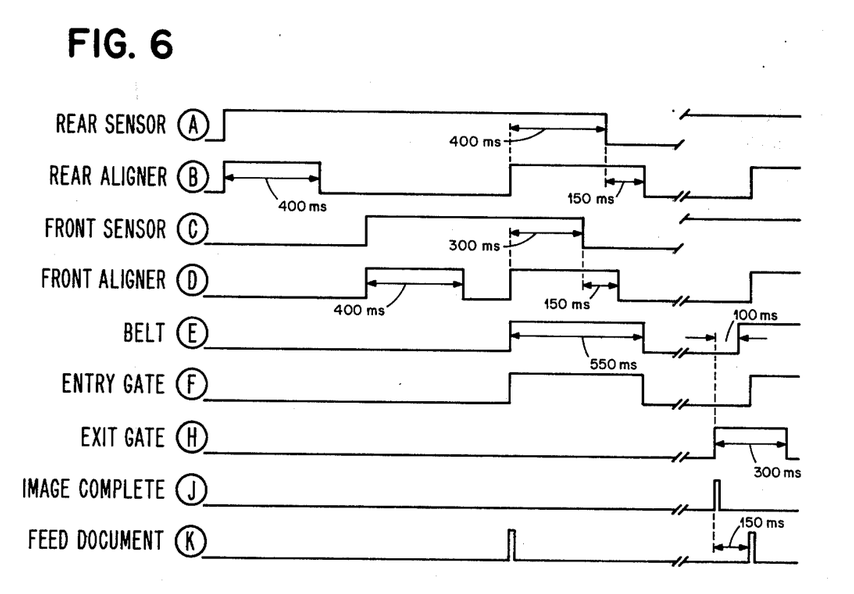
FIG. 6 is a timing diagram showing control signals generated by the logic in FIG. 5.

Referring now to FIGS. 5 and 6 the electronic logic and electrical signals to control the apparatus of FIGS. 1 through 4 are shown. The electronics of FIG. 5 will handle either single or dual document feed. The timing diagram in FIG. 6 assumes a dual document feed example. Signals in FIG. 6 are identified by reference letters; the same reference letters in FIG. 5 indicate the physical location of the signals in the logic diagram.

In a dual feed operation, the operator presses the "dual" or "reduction" button 39 (FIG. 1) and places two documents in an approximately correct position on the entry plate 10 (FIG. 1) as previously described. In FIG. 5 the "dual" or "reduction" signal from push button 39 is an up level that enables AND gate 120. A signal from rear sensor 34 or front sensor 30 indicating the presence of an original in the entry station will set the main drive control latch 122 via OR 124. With the main drive control 122 set, the main drive motor 126 turns on and drives belt 78 (FIGS. 2 and 3). With belt 78 driven, belts 72 and 66 are also driven so that driving power is available, if selected, to power the aligner wheels 18 and 20, and the document feed belt 14 (FIGS. 2 and 3).

The aligner wheels are clutched on when their associated sensor senses an original document has just been placed adjacent the wheels. Waveform A from rear sensor 34 is passed by AND gate 120 and OR 128 to the rear aligner control latch 130. The rising edge of waveform A sets latch 130. Solenoid 88 is energized clutching drive power to rear aligner wheel 20 (FIG. 2). The rising edge of waveform A also energizes the 400 millisecond delay 132. Delay 132 generates a pulse 400 milliseconds after the rising edge of waveform A. This pulse is passed by OR 134 to reset the rear aligner control latch 130. Thus solenoid 88 is energized for a period of 400 milliseconds as indicated by waveform B.

In the same manner when front sensor 30 senses the presence of a document it passes a waveform C via OR 136 to front aligner control latch 138. The rising edge of waveform C sets the front aligner control latch. With latch 138 set, the front aligner solenoid 86 is energized to clutch power to the front aligner wheel 18 (FIG. 2). The rising edge of waveform C also initiates a 400 millisecond delay 140. Delay 140 generates an output pulse 400 milliseconds after the rising edge of waveform C. This output pulse is passed by OR 142 to reset front aligner control latch 138. Accordingly, the front aligner solenoid 86 is energized for a period of 400 milliseconds as indicated by waveform D.

The 400 millisecond energization of solenoids 86 and 88 is long enough for the aligner wheels 18 and 20 to corner register the original documents in the front and rear corners of the entry plate 10. There is nothing critical in the selection of a 400 millisecond delay for delaying circuits 132 and 140. The time interval should be selected to be sufficient to allow the aligner wheels to corner register the original documents.

Each pulse from the 400 millisecond delays 132 and 140 are passed to the copier cycle control 144. The copier cycle control looks for the presence of these pulses to determine whether originals are in the proper position on the entry plate for feeding onto the document glass. When the "single" pushbutton 38 signals a single original over line 146 the copier cycle control monitors only the delay circuit 140 associated with front sensor 30. If the signal is present, control 144 will issue a feed document signal at the appropriate time in the copier cycle.

In a dual document feed the copier cycle control 144 receives an up level signal from the "dual" or "reduction" button 39 over line 148. Control 144 then monitors both of the delays 132 and 140 for pulses indicating both documents had been properly fed and are corner registered in the entry station. After detecting both pulses, the control 144 will generate a feed document pulse, waveform K, at the appropriate time in the copy cycle.

The feed document pulse turns on both aligner wheels, drops the entry gate, and turns on the document feed belt. The rear aligner wheel is turned on by the feed document pulse being passed through OR 128 to set rear aligner control latch 130. Similarly, the front aligner wheel is turned on by the feed document pulse being passed through the OR 136 to set the front aligner control 138. The entry gate is dropped by the feed document pulse setting the entry gate control latch 150. With latch 150 set the entry gate solenoid 104 is energized (waveform F). At the same time the feed document pulse is passed by OR 152 to set the belt control latch 154. With latch 154 set, the document feed belt solenoid 90 is energized (waveform E).

The aligner wheels now drive the original documents simultaneously forward to be carried by the document feed belt 14 (FIG. 1) onto the document glass 12 until both original documents abut against the exit gate 17 (FIG. 2). The belt control latch 154 is reset either 150 milliseconds after the last document front or rear has left the front or rear sensor or after the belt has run a minimum of 500 milliseconds. The entry gate control latch 150 is reset 150 milliseconds after the last document front or rear has left the front or rear sensor. Thus the entry gate is in position to catch the next documents to be copied.

The 500 millisecond minimum drive time for the feed belt is to prevent the belt from stopping to early if short documents have been fed onto the document glass. In other words, if the belt were reset 150 milliseconds after both the front and rear sensors had detected the trailing edges of both documents and the documents were short documents, the belt would be stopped before the short originals were abutted against the exit gate.

The resetting of the belt control in accordance with the 500 millisecond minimum time is controlled by AND gate 156. AND gate 156 is enabled if there is a signal from both the rear sensor latch 158 and the front sensor latch 160. The front sensor latch 160 is set if during the operation of the belt a pulse is received from the 150 millisecond delay 162. Delay 162 will have an output pulse 150 milliseconds after the trailing edge of the front sensor signal waveform C. This pulse is past by AND gate 164 to set latch 160 if the belt control latch 154 is set. Rear sensor latch 158 is set in exactly the same manner as the front sensor latch 160. The 150 millisecond delay 166 has an output pulse 150 milliseconds after the trailing edge of waveform A. This pulse will be passed by AND gate 168 if the belt control latch 154 is set. From AND gate 168 the pulse is passed by OR 170 to set the rear sensor latch 158.

The function of the front and rear sensor latches 160 and 158 is to remember that a document has been fed from the front or rear corner of the entry station 10 to the document glass 12. With both of the latches 158 and 160 set, AND gate 156 is enabled and will pass a pulse from the 500 millisecond delay 172. Delay 172 generates an output pulse 500 milliseconds after the leading edge of the waveform E. If both of the latches 158 and 160 have not been set when delay 172 generates its pulse, then AND gate 156 is not effective to reset the belt control latch 154 via OR 174.

The other reset input to OR 174 is from AND gate 176. AND gate 176 is inhibited during the time of operation of the delay circuit 172. Otherwise, AND gate 176 is enabled. In other words, the output over line 178 from delay 172 is a 500 millisecond pulse which begins at the time latch 154 is set. During this pulse AND gate 176 is blocked.

Five hundred milliseconds after the document feed belt begins to drive, AND gate 176 is enabled. Gate 176 then passes signals collected by OR 180 from AND gates 182 and 184. The function of AND gates 182 and 184 is to generate a pulse signal 150 milliseconds after the last document of the dual documents has left the entry plate.

AND gate 182 is enabled by the front sensor latch 160. If the front sensor latch 160 is set, this means that at least 150 milliseconds earlier the front sensor detected that the document at the front corner of the entry plate had left the entry plate and was now on the document glass. If, after latch 160 is set, AND gate 182 then receives a pulse from the 150 millisecond delay 166, gate 182 will pass that pulse to OR 180. This would indicate that the document at the rear corner is the last document to leave the entry plate and has in fact left the entry plate. Thus the pulse from the 150 millisecond delay 166 is passed by AND 182, OR 180, AND 176, and OR 174 to reset the belt control latch 154 and thereby turn off the feed document belt. The pulse through OR 180 also resets the entry gate control latch 150 and thus raises the entry gate.

In the same manner as AND gate 182, AND gate 184 may generate a last-document-to-leave pulse. AND gate 184 is enabled by the rear sensor latch 158. During dual document feed, the rear sensor latch 158 is set 150 milliseconds after the rear sensor 34 has detected the trailing edge of the rear document leaving the entry plate to enter onto the document glass. With rear sensor latch 158 set, AND gate 184 then monitors the 150 millisecond delay 162 from front sensor 30. Delay 162 will generate a pulse 150 milliseconds after the front document has left the entry plate. Accordingly, AND gate 184 will have an output pulse 150 milliseconds after the front document has left the entry plate if that document is the last document to leave the entry plate. This pulse will be passed by OR 180, AND 176, and OR 174 to reset belt control latch 154. Also the pulse from OR 180 resets the entry gate control latch 150.

The rear sensor latch 158 has an additional input through OR 170 to permanently set the latch in the event that the copier is operating in a "single" rather than "dual" document feed mode. In a single document feed mode, the rear sensor is not used. Therefore, the "single" condition selected by the operator when pushing button 38 (FIG. 1) is utilized to permanently set the rear sensor latch 158. Thus, AND gate 184 is always enabled during single document feed. In single document feed AND gate 184 will therefore always pass the 150 millisecond pulse from delay 162 to indicate the single document has left the front of the entry plate.

The 150 millisecond delay provided by delays 162 and 166 is chosen to allow some belt drive time to abut the original documents against the exit gate before the belt drive is turned off. Other delay times may be appropriate depending upon the exact configuration of the document feed path. The only objective is to insure that an original document will be abutted against the exit gate before the document feed belt is turned off.

The rear sensor latch 158 and the front sensor latch 160 are reset by a delayed pulse signal from delay 186 attached to the reset input of belt control latch 154. This delay is very short in duration and may not be required at all. Its purpose is to prevent latches 158 and 160 from resetting while they are controlling the resetting of the belt control latch 154.

In the example of the waveforms in FIG. 6 it is assumed that the document at the front corner of the entry plate cleared the front sensor 300 milliseconds after the feed belt drive came on. It is further assumed that the document at the rear corner of the entry plate cleared the rear sensor 400 milliseconds after the document feed belt drive came on. In this situation, the front sensor latch would be set 450 milliseconds after the drive started. The rear sensor latch 158 would be set 550 milliseconds after the belt drive came on. Therefore, AND gate 156 would not be enabled until 550 milliseconds after the start of belt drive. As this is 50 milliseconds after the pulse from the 500 millisecond delay 172, AND gate 156 will not reset the belt control latch 154 in this situation.

Five hundred milliseconds after the belt drive, AND gate 176 is enabled. Since front sensor latch 160 was set at 450 milliseconds, AND gate 182 is also enabled when AND gate 176 is enabled. Therefore, when delay 166 generates a pulse 150 milliseconds after the trailing edge passes the rear sensor (550 milliseconds after the start of the belt drive), that pulse is passed by AND 182 and OR 180 to reset the entry gate control latch 150 and further passed by AND 176 and OR 174 to reset the belt control latch 154. This action turns off the belt drive and raises the entry gate. At this point in time, both documents are corner registered side by side on the document glass at the exit gate and copier cycle control 144 is so notified by line 181.

Copier cycle control generates a pulse after the originals on the document glass have been scanned a sufficient number of times to make the number of copies selected by the operator. After the last scan the copier cycle control 144 generates a pulse indicating image complete — waveform J. In waveforms of FIG. 6 the waveforms are broken to indicate the unknown quantity of time required before the image complete signal, waveform J, occurs. Further, in FIG. 6 it is assumed that during this time interval the operator has placed two more documents for dual document feed on the entry plate. If this is the case, the signals A and C for the front and rear sensors will be at an up level. Also it is assumed that the front and rear aligner controls 138 and 130, respectively, have been cycled through their 400 millisecond drive period to corner register the originals on the entry plate.

At image complete time, image complete pulse K is passed directly to the exit gate control latch 188. When the gate control latch is set, the exit gate solenoid 110 is energized (waveform H) to drop the exit gate. The exit gate control latch 188 is reset 300 milliseconds later by a pulse from the 300 millisecond delay circuit 190. Thus, the exit gate is retracted for only 300 milliseconds. The exit gate may spring back up to brush against the exiting document, but this is no problem. The exit gate is released early so that it will be in position for receipt of the next document to be scanned in the event that the next document is closely following the trailing edge of the departing document.

One hundred milliseconds after the image complete pulse, the belt control latch 154 is set. This is accomplished by a pulse from the 100 millisecond delay circuit 192 which is passed by OR 152 to set the belt control latch 154. It is assumed in this example (waveforms in FIG. 6) that the copier cycle control 144 generates a feed document pulse 150 milliseconds after the image complete pulse. This assumes that the copier cycle control 144 has sensed that dual documents are in corner register position at the entry station as previously discussed. Accordingly, the feed document pulse comes up 150 milliseconds after the image complete pulse or 50 milliseconds after the belt control latch 154 has been set by delay 192. When the feed document pulse occurs, entry gate control latch 150 is set, rear aligner control latch 130 is set and front aligner control latch 138 is set.

To review, the image complete pulse comes up and drops the exit gate. One hundred milliseconds later the belt drive comes on, 50 milliseconds after the belt drive the entry gate drops and the aligner wheels come on. Accordingly, the documents just scanned are exiting from the document glass and the documents to be scanned are entering on the document glass. Three hundred milliseconds after the exit gate is pulled down, the exit gate is released so as to catch the oncoming documents from the entry plate. The resetting of the rear aligner control latch 130, the front aligner control latch 138, the entry gate control latch 150 and the belt control latch 154 will occur as previously described. Accordingly, the waveforms in FIG. 6 are extended no further.

The electronic controls shut the document feed down when there are no documents in place on the entry plate to be fed to the document glass. This is accomplished by the end of job latch 194. The end of job latch 194 is set by the image complete pulse waveform J. When latch 194 is set it enables AND gate 196. AND gate 196 will then pass the delayed reset pulse that resets the belt control latch 154. This delayed pulse is received from delay circuit 186 attached to the reset input of belt control latch 154.

The end of job latch 194 is reset by a feed document pulse from copier cycle control 144. The copier cycle control 144 will not generate a feed document pulse unless it has received pulses from delay circuits 140 and 132 indicating that documents are registered on the entry plate. Therefore, if there are no documents on the entry plate, there will be no feed document pulse. The end of job latch will not be reset. Thus, when the belt control is reset turning off the belt drive, shortly thereafter the main drive control latch 122 will be reset turning off the main drive motor 126. In this manner, the main drive control latch 122 is not reset until after the belt control has been reset. Thus, documents just scanned will be exited from the document glass before the main drive control latch turns off the main drive motor 126.

While the preferred embodiment of the invention and the electronic controls, therefore, have been extensively described, it will be apparent to one skilled in the art that other sensors and other document drive configurations might be substituted for those shown. Undoubtedly with such a substitution slightly different electronic controls would be involved. The invention herein lies not in the detailed implementation but in the combination of functions to permit side-by-side semiautomatic document feeding to a copy machine.

What is claimed is:

1. Document feeding apparatus for aligning and feeding from an entry station to a scanning station two documents simultaneously after the documents have been supplied to the scanning station sequentially, comprising:

first registering means comprising a front aligning means oriented to drive a first document against a front corner of the entry station for corner registering said first document;

second registering means comprising a rear aligning means oriented to drive a second document against a rear corner of the entry station for corner registering said second document;

said front and rear corners being positioned relative to each other such that when both documents are corner registered the documents are also side-by-side registered;

means for feeding side-by-side registered documents from said entry station to a scanning station and registering said documents at corners thereof;

control means connected to said first and second registering means and said feeding means for controlling said first and second corner registering means to side-by-side register the original documents and thereafter for controlling said feeding means to feed the documents forward in side-by-side registration on the scanning station; and selectable means for electrically deactivating said rear aligning means when said document feeding apparatus is in a single document feed mode.

2. Document feeding apparatus for aligning and feeding from an entry station to a scanning station two documents simultaneously after the documents have been supplied to the scanning station sequentially, comprising:

first registering means comprising a front aligning means oriented to drive a first document against a front corner of the entry station for corner registering said first document;

second registering means comprising a rear aligning means oriented to drive a second document against a rear corner of the entry station for corner registering said second document;

said front and rear corners being positioned relative to each other such that when both documents are corner registered the documents are also side-by-side registered;

means for feeding side-by-side registered documents from said entry station to a scanning station and registering said documents at corners thereof; and control means comprising:
front and rear sensing means associated with said front and rear aligning means for sensing the presence of a document adjacent said front and rear aligning means;
means electrically connected to each of said sensing means for selectively driving said front and rear aligning means in response to sensing the presence of a document whereby documents may be independently corner registered to the front and rear corners of the entry station;
means electrically monitoring said front and rear aligning means for activating said feeding means after said front and rear aligning means have corner registered documents side-by-side at the entry station whereby documents are fed in side-by-side registration across the scanning station.

3. Document feeding apparatus for aligning and feeding from an entry station to a scanning station two documents simultaneously after the two documents have been supplied to the scanning station sequentially comprising:
first registering means comprising a front aligning means oriented to drive a first document against a front corner of the entry station for corner registering said first document;
second registering means comprising a rear aligning means oriented to drive a second document against a rear corner of the entry station for corner registering said second document;
said front and rear corners being positioned relative to each other such that when both documents are corner registered the documents are also side-by-side registered;
gating means between said entry station and said scanning station for releasing the side-by-side registered documents at the entry station for passage to the scanning station;
means for conveying the side-by-side registered documents at the entry station onto the scanning station;
said front and rear aligning means maintaining side-by-side registration of the documents as said conveying means conveys documents across the scanning station for registering said documents at the corners thereof;
control means connected to said first and second registering means and said feeding means for controlling said first and second corner registering means to side-by-side register the original documents and thereafter for controlling said feeding means to feed the documents forward in side-by-side registration on the scanning station;
exit gating means at the scanning station for releasing documents from the scanning station;
means for signaling image complete when image scanning of documents on the scanning station is complete;
means electrically connected to said signaling means for activating said exit gating means and said conveying means when image scanning is complete, whereby dual documents on the scanning station will be conveyed out of the scanning station.

4. Method for feeding two original documents into a copying machine for simultaneous side-by-side dual document copying, said machine having two modes of operation, a single document copy mode and a dual document copying mode, said method comprising the steps of:

signaling said dual document copy mode;
sequentially placing dual documents on an entry station of the copying machine;
corner registering one of the documents to the first corner in the entry station;
corner registering the second document to a second corner spaced from said first corner such that when the second document is corner registered both documents will be in side-by-side registration relative to each other;
feeding the documents in side-by-side registration from the entry station to a scanning station in the copying machine; and
registering the documents at corners of the scanning station.

5. The method of claim 4 wherein each of said corner registering steps comprises the steps of:
sensing the presence of a document to be corner registered;
driving the document to be registered laterally against a side edge guide and forward against an entry gate to corner register each document.

6. The method of claim 5 wherein said feeding step comprises the steps of:
dropping said entry gate out of the path of the side-by-side registered documents;
conveying the side-by-side documents forward onto the scanning station; and
said registering steps comprises: driving said documents to side-by-side corner registration on the scanning station, dual corner registration on the scanning station being defined by said side edge guides and an exit gate at the boundary of said scanning station.

7. The method of claim 6 wherein said driving step comprises the steps of:
driving the side-by-side registered documents forward until both documents reach the exit gate;
driving each document laterally toward a side edge guide to maintain side-by-side registration as said forward driving step drives the documents forward to the exit gate.

8. The method of claim 4 and in addition:
the step selectively inhibiting said second corner registration step when feeding single documents from the entry station to the scanning station.

9. In a copier capable of copying single documents in a single document mode and capable of reduction copying of dual documents in a reduction mode and having a document entry station separate from a document scanning station, selectable document feed apparatus comprising:
selectable means for signaling reduction mode;
side-by-side registering means at the document entry station, said registering means electrically connected to said selectable means for machine registering dual sequentially supplied documents in side-by-side position during the reduction mode;
feeding means for feeding said side-by-side registered documents from the entry station to the scanning station and for registering said documents in side-by-side position at said scanning station; and
copier cycle control means electrically connected to said registering means and said feeding means for activating said feeding means after said registering means has registered the dual documents at the entry station and before the scanning portion of the copier cycle.

10. The apparatus of claim 9 wherein said feeding means comprises:

entry gating means between said entry station and said scanning station for releasing the side-by-side registered documents at the entry station for passage to the scanning station;

means for conveying the side-by-side registered documents at the entry station onto the scanning station;

said side-by-side registering means maintaining side-by-side registration of the documents as said conveying means conveys the dual documents across the scanning station.

11. The apparatus of claim 10 and in addition:

exit gating means at the scanning station for releasing documents from the scanning station;

said copier cycle control means also electrically connected to said exit gating means for activating said exit gating means along with said conveying means and said entry gating means whereby dual documents on the scanning station will be conveyed out of the scanning while dual documents registered at the entry station will be conveyed onto the scanning station.

12. In a copier capable of copying single documents in a single document mode and capable of reduction copying of dual documents in a reduction mode and having a document entry station separate from a document scanning station; selectable document feed apparatus comprising:

selectable means for signaling reduction mode and for signaling single mode;

side-by-side registering means at the document entry station, said registering means electrically connected to said signaling means for machine registering in side-by-side position during the reduction mode dual documents sequentially supplied to the entry station and for disabling one registering means for machine registering during the single mode a single document supplied to the entry station;

feeding means for feeding said registered documents from the entry station to the scanning station; and copier cycle control means electrically connected to said registering means and said feeding means for activating said feeding means after said registering means has registered the dual documents at the entry station during said reduction mode and said single document during said single mode, and before the scanning portion of the copier cycle.

13. The apparatus of claim 12 wherein said registering means comprises:

a front aligning means oriented to drive a first document against a front corner of the entry station;

a rear aligning means oriented to drive a second document against a rear corner of the entry station; and wherein said copier cycle control means additionally comprises:

front and rear sensing means associated with said front and rear aligning means for sensing the presence of a document adjacent said front and rear aligning means;

means electrically connected to each of said sensing means for selectively driving said front and rear aligning means in response to sensing the presence of a document whereby documents may be independently corner registered to the front and rear corners of the entry station;

means electrically monitoring said front and rear aligning means for activating said feeding means after said front and rear aligning means have corner registered documents side-by-side at the entry station whereby documents are fed in side-by-side registration across the scanning station.

14. Method for feeding two original documents into a copying machine for simultaneous side-by-side dual document copying in dual mode operation and for single copying of a single document in single mode operation comprising the steps of:

signaling the selection of one of said modes of operation;

corner registering a supplied document to a first corner in an entry station;

responding to said dual mode selection by corner registering a supplied second document to a second corner spaced from said first corner such that when the second document is corner registered both documents will be in side-by-side registration relative to each other;

responding to said single mode selection by omitting said second document corner registering step; and responding to completion of said first corner registering step in said single mode by feeding said single document from the entry station to a scanning station in the copying machine and to completion of both said first and second corner registering steps in said dual mode by feeding the documents in side-by-side registration from the entry station to a scanning station in the copying machine.

15. The method of claim 14 wherein each of said corner registering steps comprises the steps of:

sensing the presence of a document to be corner registered;

driving the document to be registered laterally against a side edge guide and forward against an entry gate to corner register each document.

16. The method of claim 15 wherein said feeding step comprises the steps of:

dropping said entry gate out of the path of the registered documents;

conveying the documents forward onto the scanning station to corner registration on the scanning station, corner registration on the scanning station being defined by said side edge guides and an exit gate at the boundary of said scanning station.

17. The method of claim 16 wherein said conveying step in dual mode comprises the steps of:

driving the side-by-side registered documents forward until both documents reach the exit gate;

driving each document laterally toward a side edge guide to maintain side-by-side registration as said forward driving step drives the documents forward to the exit gate.

* * * * *